United States Patent
Wang et al.

(10) Patent No.: US 12,375,013 B1
(45) Date of Patent: Jul. 29, 2025

(54) POWER LIMITING CONTROL FOR SHARED DC BUS LOADS

(71) Applicant: Amazon Technologies, Inc., Seattle, WA (US)

(72) Inventors: Xiaoqi Wang, Bellevue, WA (US); Lizon Maharjan, Seattle, WA (US); Dean Joseph Brestel, Shoreline, WA (US); Andrew Lueneburg, Seattle, WA (US); Frederic Pierre Lacaux, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 268 days.

(21) Appl. No.: 17/708,969

(22) Filed: Mar. 30, 2022

(51) Int. Cl.
- *H02P 5/68* (2006.01)
- *B64C 27/32* (2006.01)
- *B64D 27/24* (2006.01)
- *B64D 31/00* (2006.01)
- *B64U 30/20* (2023.01)

(52) U.S. Cl.
CPC ............... *H02P 5/68* (2013.01); *B64C 27/32* (2013.01); *B64D 27/24* (2013.01); *B64D 31/00* (2013.01); *B64D 2221/00* (2013.01); *B64U 30/20* (2023.01); *B64U 2201/10* (2023.01)

(58) Field of Classification Search
CPC ....... H02P 5/68; B64D 27/24; B64D 2221/00; B64U 30/20; B64U 2201/10
See application file for complete search history.

(56) References Cited

U.S. PATENT DOCUMENTS

| | | | | |
|---|---|---|---|---|
| 7,402,965 | B2* | 7/2008 | Oestreich | H02P 5/74 361/33 |
| 8,648,559 | B2* | 2/2014 | Singh | B60L 15/20 318/400.42 |
| 9,376,208 | B1* | 6/2016 | Gentry | G05D 1/042 |
| 9,611,835 | B1* | 4/2017 | Vander Lind | F03D 1/02 |
| 9,783,185 | B2* | 10/2017 | Zhou | B60L 58/21 |
| 9,930,027 | B2* | 3/2018 | Canavor | H04W 12/062 |
| 10,023,318 | B2* | 7/2018 | Kobayashi | H02P 5/46 |
| 10,270,381 | B2* | 4/2019 | Tao | B64C 39/024 |
| 11,128,251 | B1* | 9/2021 | Solodovnik | H02P 25/22 |
| 2008/0006739 | A1* | 1/2008 | Mochida | H02K 16/00 267/136 |

* cited by examiner

*Primary Examiner* — Rina I Duda
(74) *Attorney, Agent, or Firm* — Athorus, PLLC

(57) ABSTRACT

Described are systems and methods for monitoring and managing power sharing across multiple loads connected to a shared direct current (DC) bus. Embodiments of the present disclosure may be implemented to monitor and manage power sharing between multiple propulsion mechanisms (e.g., motors) of an aerial vehicle, such as an unmanned aerial vehicle (UAV). One or more shape functions establishing current limits as a function of the DC bus voltage may be determined for each load (e.g., propulsion mechanism/motor) of the multiple loads (e.g., propulsion mechanisms/motors) connected to the DC bus, and the current consumed by each load can be limited based on the DC bus voltage and each shape function.

18 Claims, 9 Drawing Sheets

POWER LIMITING CONTROL FOR SHARED DC BUS LOADS

BACKGROUND

A direct current (DC) bus may often be employed in distributing power from a power supply to multiple loads. A DC bus may be used in in many electric devices and vehicles, such as unmanned aerial vehicles (UAVs), in distributing power to multiple loads, such as the motors and/or propulsion mechanisms of such vehicles. However, an inefficient power sharing scheme across the multiple loads may lead to a DC bus voltage collapse and/or require an oversized power supply to be able to support high instantaneous loads to avoid such collapses in the DC bus voltage.

DETAILED DESCRIPTION

Figure 1:
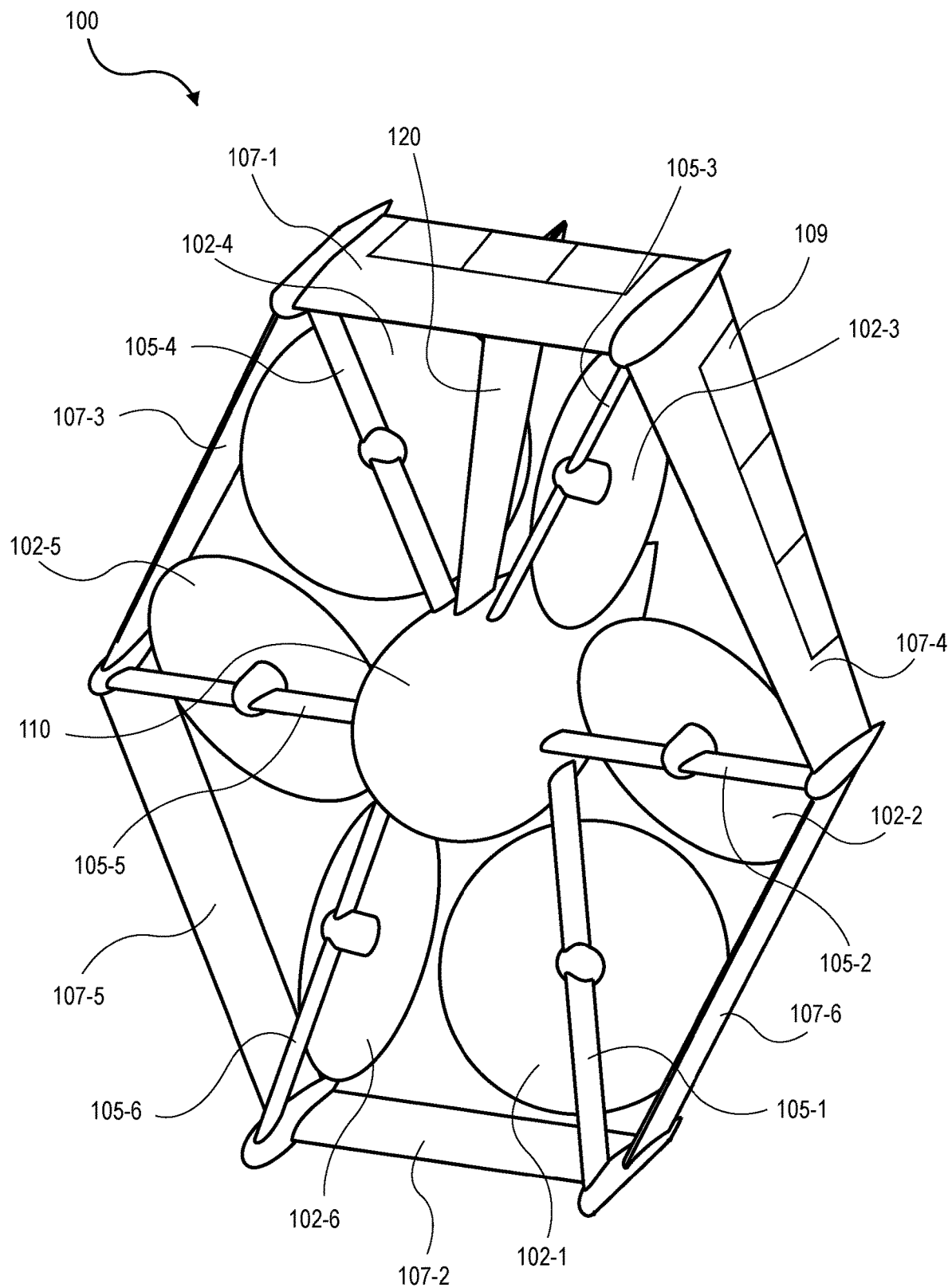
FIG. 1 illustrates an exemplary unmanned aerial vehicle, according to exemplary embodiments of the present disclosure.

As is set forth in greater detail below, embodiments of the present disclosure are generally directed to systems and methods for monitoring, limiting, and managing power sharing across multiple loads connected to a shared direct current (DC) bus. Exemplary embodiments of the present disclosure may be implemented to monitor and manage power sharing between multiple propulsion mechanisms (e.g., motors) of an aerial vehicle, such as an unmanned aerial vehicle (UAV). According to exemplary embodiments of the present disclosure, one or more shape functions establishing current limits as a function of the DC bus voltage may be determined for each load (e.g., propulsion mechanism/motor) of the multiple loads (e.g., propulsion mechanisms/motors) connected to the DC bus. The one or more shape functions may be determined based at least in part on parameters of the UAV (e.g., DC bus voltage thresholds, DC bus voltage drop thresholds, parameters associated with the propulsion mechanism/motor, parameters associated with the power supply, etc.), historical operational parameters associated with the UAV, and the like. In an exemplary implementation, a shape function may be associated with each propulsion mechanism/motor, and the DC bus voltage may be monitored. Based on the measured DC bus voltage and the shape function associated with the respective propulsion mechanism/motor, a maximum allowable DC current can be determined for each respective propulsion mechanism/motor. A maximum motor current can then be calculated for each respective propulsion mechanism/motor based on the maximum allowable DC current. The maximum allowable motor current can be stored and maintained as the motor current limit for each respective propulsion mechanism/motor.

According to exemplary embodiments of the present disclosure, the shape function associated with each respective propulsion mechanism/motor may be different and may be based on the operational parameters (and/or expected operational parameters) associated with each respective propulsion mechanism/motor. For example, the operational parameters (and/or expected operational parameters) may be used to determine a priority for each respective propulsion mechanism/motor, which may represent a criticality of continued operation of the respective propulsion mechanism/motor in view of a particular operating condition. Accordingly, based on the priorities for the propulsion mechanisms/motors, the thresholds and the shape functions may be determined and associated with each respective propulsion mechanism/motor so that the propulsion mechanisms/motors having a higher priority are provided with higher current limits to facilitate continued operation, while the propulsion mechanisms/motors having a lower priority may be provided with a lower current limit.

Advantageously, embodiments of the present disclosure may be implemented in a controller (e.g., electronic speed controllers) associated with each respective propulsion mechanism/motor, so as to provide a decentralized power sharing management system that introduces little additional complexity and no additional hardware. Further, the power sharing management provided by exemplary embodiments of the present disclosure can facilitate utilizing a smaller power supply (e.g., battery) compared to what typically may be required, while satisfying the performance requirements associated with the power supply.

FIG. 1 illustrates an exemplary unmanned aerial vehicle 100, according to exemplary embodiments of the present disclosure.

As shown in FIG. 1, aerial vehicle 100 may include a ring wing that is substantially hexagonal in shape and that surrounds a plurality of propulsion mechanisms. Aerial vehicle 100 may include six propulsion mechanisms 102-1, 102-2, 102-3, 102-4, 102-5, and 102-6 spaced about fuselage 110 of aerial vehicle 100. Although aerial vehicle 100 is shown with six propulsion mechanisms 102, aerial vehicle 100 may include any number of propulsion mechanisms 102. Propulsion mechanisms 102 may include motors, propellers, or any other form of propulsion and may each be controlled by a respective electronic speed controller. For example, one or more of propulsion mechanisms 102 of aerial vehicle 100 may utilize fans, jets, turbojets, turbo fans, jet engines, and/or the like to maneuver the aerial vehicle. Generally described, propulsion mechanism 102, as used herein, can include any form of propulsion mechanism that is capable of generating a force sufficient to maneuver aerial vehicle 100, alone and/or in combination with other propulsion mechanisms. Furthermore, in certain implementations, propulsion mechanisms 102 may be configured such that their individual orientations may be dynamically modified.

Likewise, while the examples herein describe the propulsion mechanisms being able to generate force in either direction, in some implementations, the propulsion mechanisms may only generate force in a single direction. However, the orientation of the propulsion mechanism may be adjusted so that the force can be oriented in a positive direction, a negative direction, and/or any other direction.

In the illustrated implementation, aerial vehicle 100 can also include ring wing 107 having a substantially hexagonal shape that extends around and forms the perimeter of aerial vehicle 100. In the illustrated example, ring wing 107 can include six segments 107-1, 107-2, 107-3, 107-4, 107-5, and 107-6 that are joined at adjacent ends to form ring wing 107 around aerial vehicle 100. Each segment of ring wing 107 has an airfoil shape to produce lift when aerial vehicle 100 is oriented and moving in a direction that is substantially horizontal. As illustrated, and discussed further below, the ring wing is positioned at a canted angle with respect to fuselage 110 such that lower segment 107-2 of ring wing 107 acts as a front wing as it is toward the front of the aerial vehicle when oriented as shown and moving in a horizontal direction. Upper segment 107-1 of ring wing 107, which has a longer chord length than lower segment 107-2 of ring wing 107, is positioned, in a horizontal orientation, further back relative to lower segment 107-2, and thus can act as a rear wing.

Ring wing 107 can be secured to fuselage 110 by motor arms 105. In this example, motor arms 105-1, 105-2, 105-3, 105-4, 105-5, and 105-6 are coupled to fuselage 110 at one end and are coupled to ring wing 107 at a second end, thereby securing ring wing 107 to fuselage 110. In other implementations, less than all of motor arms 105 may extend from fuselage 110 and couple to ring wing 107.

In some implementations, aerial vehicle 110 may also include one or more stabilizer fins 120 that extend from fuselage 110 to ring wing 107. Stabilizer fin 120 may also have an airfoil shape. In the illustrated example, stabilizer fin 120 extends vertically from fuselage 110 to ring wing 107. In other implementations, stabilizer fin 120 may be disposed at other positions. For example, stabilizer fin 120 may extend downward from the fuselage between motor arm 105-1 and motor arm 105-6.

As illustrated, propulsion mechanisms 102 may be oriented at different angles with respect to each other. For example, propulsion mechanisms 102-2 and 102-5 can be aligned with fuselage 110 such that the force generated by each of propulsion mechanisms 102-2 and 102-5 is in-line or in the same direction or orientation as the fuselage. In the illustrated example, aerial vehicle 100 is oriented for high-speed, fixed-wing, wing-borne, horizontal flight such that the fuselage is oriented horizontally in the direction of travel. In such an orientation, propulsion mechanisms 102-2 and 102-5 provide horizontal forces, also referred to herein as thrusting forces and act as thrusting propulsion mechanisms.

In comparison to propulsion mechanisms 102-2 and 102-5, each of propulsion mechanisms 102-1, 102-3, 102-4, and 102-6 are offset or angled with respect to the orientation of fuselage 110. Accordingly, when aerial vehicle 100 is oriented for horizontal flight, propulsion mechanisms 102-1, 102-3, 102-4, and 102-6 may be used to provide thrust in a non-horizontal direction to cause the aerial vehicle to pitch, yaw, roll, heave and/or sway. In other implementations, during horizontal flight, propulsion mechanisms 102-1, 102-3, 102-4, and 102-6 may be disabled such that they do not produce any forces and the aerial vehicle 100 may be propelled aerially in a horizontal direction as a result of the lifting force from the aerodynamic shape of the ring wing 107 and the horizontal thrust produced by propulsion mechanisms 102-2 and 102-5.

The angle of orientation of each of the propulsion mechanisms 102-1, 102-2, 102-3, 102-4, 102-5, and 102-6 may vary for different implementations. Likewise, in some implementations, the offset of the propulsion mechanisms 102-1, 102-2, 102-3, 102-4, 102-5, and 102-6 may each be the same, with some oriented in one direction and some oriented in another direction, may each be oriented different amounts, and/or in different directions.

In the illustrated example of FIG. 1, each propulsion mechanism 102-1, 102-2, 102-3, 102-4, 102-5, and 102-6 may be oriented approximately thirty degrees with respect to the position of each respective motor arm 105-1, 105-2, 105-3, 105-4, 105-5, and 105-6. In addition, the direction of orientation of propulsion mechanisms 102-1, 102-2, 102-3, 102-4, 102-5, and 102-6 is such that pairs of propulsion mechanisms are oriented toward one another. For example, propulsion mechanism 102-1 is oriented approximately thirty degrees toward propulsion mechanism 102-6. Likewise, propulsion mechanism 102-2 is oriented approximately thirty degrees in a second direction about third motor arm 105-2 and oriented toward propulsion mechanism 102-3. Finally, propulsion mechanism 102-4 is oriented approximately thirty degrees in the first direction about fourth motor arm 105-4 and toward propulsion mechanism 102-5. As illustrated, propulsion mechanisms 102-3 and 102-6, which are on opposing sides of fuselage 110, are aligned and oriented in a same first direction (in this example, horizontal). Propulsion mechanisms 102-2 and 102-5, which are on opposing sides of fuselage 110, are aligned and oriented in a same second direction, which is angled compared to the first direction. Propulsion mechanisms 102-1 and 102-4, which are on opposing sides of fuselage 110, are aligned and oriented in a same third direction, which is angled compared to the first direction and the second direction.

Figure 2:
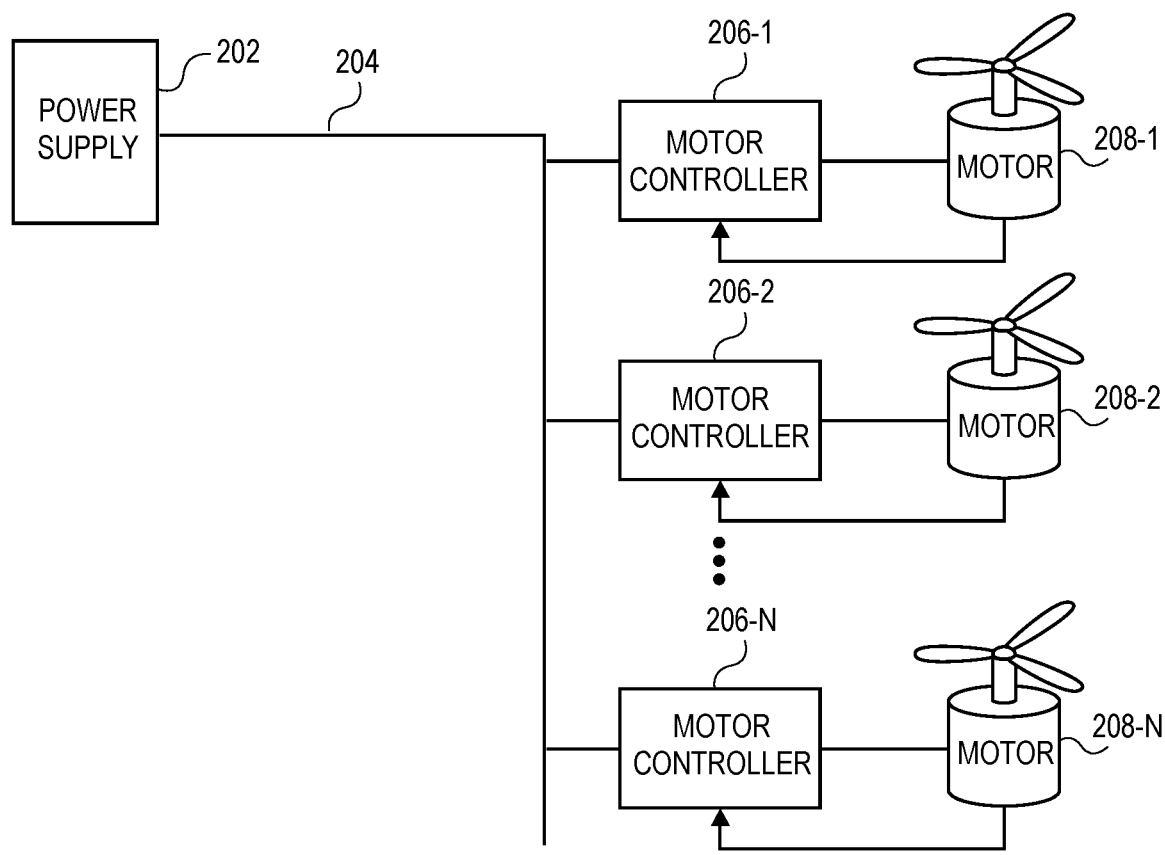
FIG. 2 is a block diagram illustrating a simplified exemplary shared DC bus system, according to exemplary embodiments of the present disclosure.

FIG. 2 is a block diagram illustrating a simplified exemplary shared DC bus system 200, according to exemplary embodiments of the present disclosure.

As shown in FIG. 2, exemplary shared DC bus system 200 can include power supply 202, shared DC bus 204, motor controllers 206, and motors 208. In exemplary implementations, exemplary shared DC bus system 200 may represent a shared DC bus configuration that may be used to power multiple propulsion mechanisms/motors (e.g., propulsion mechanism 102) of an aerial vehicle, such as a UAV (e.g., aerial vehicle 100). As shown in FIG. 2, exemplary shared DC bus system 200 can include any number of motors 208 (e.g., motor 208-1, 208-2, through 208-N) and corresponding motor controllers 206 (e.g., motor controller 206-1, 206-2, through 206-N).

In operation, power provided by power supply 202 may be provided to motors 208 via shared DC bus 204. Motor controllers 206 may control the operation of each corresponding motor 208. For example, based on flight commands received in connection with the operation of the UAV, each motor controller 206 may control the operation of each respective motor 208. Accordingly, the power consumed (and the load presented) by each motor 208 may vary depending on the operation of each respective motor 208. For example, during operating conditions where any of motors 208 is commanded to generate increased thrust, any such motors 208 may draw increased current, thereby consuming additional power and presenting an increased load on shared DC bus 204. Conversely, during operating conditions where any of motors 208 is commanded to generate decreased thrust, any such motors 208 may draw less current, thereby consuming less power and presenting a decreased load on shared DC bus 204. Further, as shown in FIG. 2, motor controllers 206 may receive feedback information from motors 208 (e.g., revolutions per minute/angular velocity, temperature, operating status, etc.).

Under certain operating conditions where one or more of motors 208 may be required to generate increased thrust, thereby drawing increased current, the DC bus voltage on shared DC bus 204 may experience a drop in voltage. In situations where motors 208 are drawing increased current, the cumulative load presented by all motors 208 may cause the DC bus voltage on shared DC bus 204 to drop below a threshold value, thereby causing a collapse of the DC bus voltage (e.g., a brown-out condition).

Figure 3:
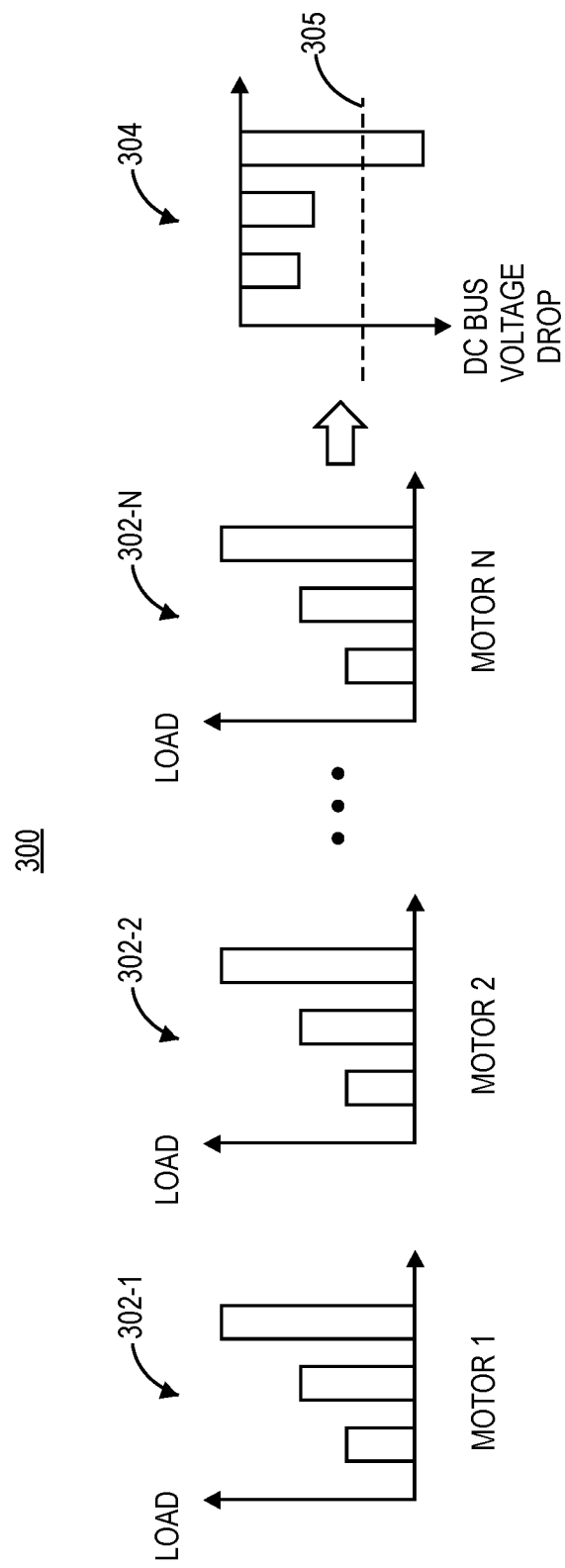
FIG. 3 is an exemplary graphical representation of exemplary loads presented by multiple motors electrically coupled to a shared DC bus and the DC bus voltage on the shared DC bus, according to exemplary embodiments of the present disclosure.

FIG. 3 is an exemplary graphical representation 300 of exemplary loads presented by multiple motors electrically coupled to a shared DC bus and the DC bus voltage on the shared DC bus, according to exemplary embodiments of the present disclosure.

FIG. 3 illustrates graphical representation 300, which includes graphical representations 302 of power consumed/loads presented by corresponding motors (e.g., motors 208) connected via a shared DC bus (e.g., shared DC bus 204) of a shared DC bus system (e.g., shared DC bus system 200) and a corresponding graphical representation 304 of a DC bus voltage on the shared DC bus in view of the power consumed/loads presented by the motors on the shared DC bus system and illustrated in graphical representations 302.

As shown FIG. 3, each of graphical representations 302-1, 302-2, and 302-N may correspond to the power consumed and/or loads presented by motors (e.g., motors 208-1, 208-2, and 208-N, respectively) of a shared DC bus system. Although FIG. 3 presents each of Motor 1, Motor 2, and Motor N presenting substantially equal loads as a function of time, according to certain implementations, each of Motor 1, Motor 2, and Motor N may consume different amounts of power/present different loads from each other. In the illustrated implementation, as shown by graphical representations 302, each of Motor 1, Motor 2, and Motor N may consume different amounts of power (and present different loads) based on operating conditions of the respective motor and may vary as a function of time. Increases in the consumed power/loads presented by Motor 1, Motor 2, and/or Motor N may correspond to situations where Motor 1, Motor 2, and/or Motor N is drawing increased current in response to a command issued to increase thrust in connection with the operation of the UAV, while decreases in the consumed power/loads presented by Motor 1, Motor 2, and/or Motor N may correspond to situations where Motor 1, Motor 2, and/or Motor N is drawing decreased current in response to a command issued to decrease thrust in connection with the operation of the UAV.

As shown in graphical representation 304 of FIG. 3, the varied power consumption and/or loads (e.g., and current draw) of Motor 1, Motor 2, and/or Motor N may also be reflected in the DC bus voltage of the shared DC bus. For example, as power consumption increases, the cumulative loads presented by Motor 1, Motor 2, and/or Motor N increases, and the DC bus voltage on the shared DC bus may decrease. In certain situations where the power consumption/load of Motor 1, Motor 2, and/or Motor N is sufficiently high, the cumulative power consumption/load (and current draw) of Motor 1, Motor 2, and/or Motor N may cause the DC bus voltage on the shared DC bus to drop below threshold value 305 (which may represent a collapse in the DC bus voltage), thereby causing a collapse of the DC bus voltage (e.g., a brown-out condition). Accordingly, exemplary embodiments of the present disclosure may provide monitoring of the DC bus voltage and management of the power consumed by each motor to prevent a collapse of the DC bus voltage during high demand situations.

Returning to the exemplary shared DC bus system 200 illustrated in FIG. 2, embodiments of the present disclosure can provide a current limiting mechanism to control and manage the power consumed (and the loads presented) by each of motors 208-1, 208-2, through 208-N. Preferably, the current limiting mechanisms may facilitate prevention of a collapse of the DC bus voltage on shared DC bus 204.

According to exemplary embodiments of the present disclosure, the current limiting mechanism may facilitate determination of a shape function for each of motors 208-1, 208-2, and 208-N. The shape function for each of motors 208-1, 208-2, and 208-N may establish DC current limits on shared DC bus 204 as a function of the DC bus voltage on shared DC bus 204. The shape function for motors 208-1, 208-2, and/or 208-N may be determined based on the particular application of shared DC bus system 200 and each of motors 208-1, 208-2, and/or 208-N and may establish DC current limits as a function of the DC bus voltage so as to prevent collapse of the DC bus voltage on the shared DC bus (e.g., brown-out condition) in view of the cumulative load presented by motors 208-1, 208-2, and/or 208-N. For example, the shape function for motors 208-1, 208-2, and/or 208-N may be determined based on one or more DC bus voltage thresholds. For each DC bus voltage threshold, a corresponding DC current limit may be established and the shape of the shape function between each of the DC bus voltage thresholds may also be determined. For example, the shape function between at least some of the one or more DC bus voltage thresholds may be based on any function and/or relationship between the DC voltage bus voltage and the DC current (e.g., linear, polynomial, exponential, logarithmic, etc.). The shape function(s) associated with motors is described in further detail herein in connection with FIGS. 4A-4D.

After the shape function(s) have been determined for motors 208-1, 208-2, and/or 208-N, the respective shape function(s) may be written to motor controllers 206-1, 206-2, and/or 206-N so that motor controllers 206-1, 206-2, and/or 206-N may enforce the current limits defined by the shape function(s) to limit the power input to motors 208-1, 208-2, and/or 208-N. For example, for the DC bus voltage may be monitored and provided to motor controllers 206-1, 206-2, and/or 206-N. Based on the measured DC bus voltage, a corresponding DC current limit may be determined by motor controllers 206-1, 206-2, and/or 206-N based on the respective shape function for motors 208-1, 208-2, and/or 208-N. The DC current limit may be converted to a motor current limit for each of motors 208-1, 208-2, and/or 208-N. For example, the motor current limit for any of motors 208-1, 208-2, and/or 208-N may be represented as:

$$I_{Motor\_Max} = \frac{\eta V_{DC} I_{DC}}{\omega K_T}$$

where $I_{Motor\_Max}$ can represent the motor current limit, $V_{DC}$ can represent the DC bus voltage, $I_{DC}$ can represent the DC current limit, n can represent the efficiency of the respective motor, ω can represent the angular velocity of the respective motor, and $K_T$ can represent the torque constant of the respective motor. Accordingly, the determined motor current limit may be enforced by motor controllers 206-1, 206-2, and/or 206-N in connection with corresponding motors 208-1, 208-2, and/or 208-N, respectively. For example, if motor controller 206-1 receives a command to operate motor 208-1 such that it would draw 100A, but the motor current limit for motor 208-1 has been determined to be 80A, motor controller 206-1 may cause motor 208-1 to operate (e.g., generate a command/instruction) to limit the maximum allowable motor current drawn by motor 208-1 to 80A (e.g., by producing less thrust than the thrust specified by the received command, etc.).

According to exemplary implementations of the present disclosure, the shape function determined and associated with each of motors 208-1, 208-2, and 208-N may be different. According to an example implementation, the shape function for each motor 208-1, 208-2, and/or 208-N may be determined based at least in part on certain operational parameters (or expected operational parameters) associated with each motor 208-1, 208-2, and/or 208-N. The operational parameters (and/or expected operational parameters) may include, for example, parameters such as an amount of thrust to be generated (by each respective motor), primary function of the generated thrust of each respective motor (e.g., to provide lift, to provide yaw/pitch/roll control, etc.), the type of flight being performed (e.g., cruise flight, landing, take-off, hover flight, emergency maneuver, etc.), and the like, and may be used to determine a priority for each motor 208-1, 208-2, and/or 208-N. The priority associated with each motor 208-1, 208-2, and/or 208-N may represent a criticality associated with the commanded operation of each motor 208-1, 208-2, and/or 208-N in view of a particular operating condition, i.e., the motor having the highest priority may be considered to be most critical to the operation and/or safety of the UAV under the particular operating condition, and the shape function for each motor 208-1, 208-2, and/or 208-N may be then be determined based at least in part on the determined priority. Accordingly, the shape function for the motor having the highest priority may have a shape function that establishes higher current limits so that it may operate closer to the commanded operation compared to motors having a lower priority. According to exemplary embodiments of the present disclosure, the operational parameters used to determine a priority and/or a shape function for each motor may be obtained from a look-up table, dynamically obtained during operation of the UAV, so as to continuously and dynamically update the shape function during operation of the UAV, and the like.

FIGS. 4A-4D are exemplary graphical representations 400, 420, 440, and 460 of exemplary shape functions 410, 430, 450, and 470 establishing current limits as a function of a DC bus voltage, according to exemplary embodiments of the present disclosure.

The exemplary shape functions 410, 430, 450, and 470 illustrated in FIGS. 4A-4D may have been determined and associated with a motor (e.g., motors 208-1, 208-2, and/or 208-N) that is part of a shared DC bus system (e.g., shared DC bus system 200). In the exemplary implementations shown in FIGS. 4A-4D, each shape function 410, 430, 450, and 470 may include multiple DC bus voltage thresholds and may employ a different function and/or relationship between the DC voltage bus voltage and the DC current limit (e.g., linear, polynomial, exponential, logarithmic, etc.) in between certain DC bus voltage thresholds.

Figure 4A:
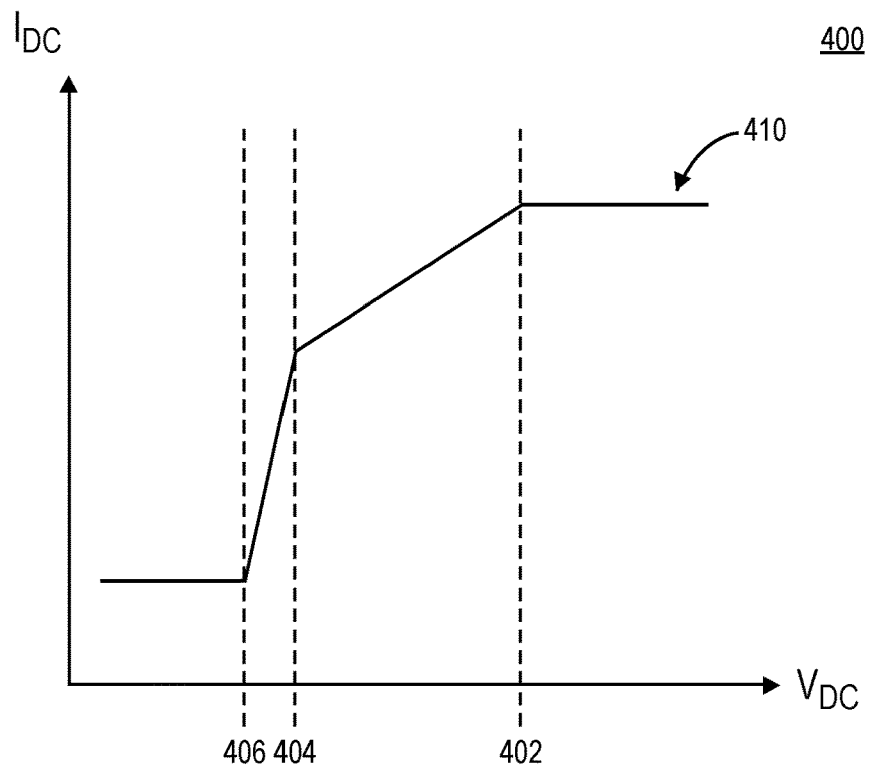
FIGS. 4A-4D are exemplary graphical representations of exemplary shape functions establishing current limits as a function of a DC bus voltage, according to exemplary embodiments of the present disclosure.

As shown in the graphical representation 400 shown in FIG. 4A, shape function 410 may include DC bus voltage thresholds 402, 404, and 406. As illustrated in FIG. 4A, when the DC bus voltage is at or above DC bus voltage threshold 402, the corresponding DC current limit may be established at a relatively high constant value such that there is effectively no DC current limit. For DC bus voltages between DC bus voltage threshold 402 and DC bus voltage threshold 404, the corresponding DC current limit may decrease in accordance with the function illustrated in FIG. 4A. In the example implementation illustrated in FIG. 4A, the corresponding current limit decreases linearly for DC bus voltages between DC bus voltage threshold 402 and DC bus voltage threshold 404. However, according to other exemplary embodiments (and as illustrated, for example, in FIGS. 4B-4D), shape function 410 may employ any type of function and/or relationship between the DC bus voltage and the DC current limit between DC bus voltage threshold 402 and DC bus voltage threshold 404. For DC bus voltages between DC bus voltage threshold 404 and DC bus voltage threshold 406, the corresponding DC current limit may again decrease linearly. Further, although FIG. 4A shows that the relationship between the DC current limit and the DC bus voltage declines linearly between DC bus voltage threshold 402 and DC bus voltage threshold 404 and DC bus voltage threshold 404 and DC bus voltage threshold 406, according to other implementations, the relationship between the DC current limit and the DC bus voltage may differ between the threshold values. For example, the DC current limit may decrease linearly as a function of the DC bus voltage between DC bus voltage threshold 402 and DC bus voltage threshold 404, while decreasing exponentially, logarithmically, as a stepwise function, etc. between DC bus voltage threshold 404 and DC bus voltage threshold 406. Conversely, the DC current limit may decrease linearly as a function of the DC bus voltage between DC bus voltage threshold 404 and DC bus voltage threshold 406, while decreasing exponentially, logarithmically, as a stepwise function, etc. between DC bus voltage threshold 402 and DC bus voltage threshold 404. Further, compared to the DC current limit corresponding to DC bus voltages between DC bus voltage thresholds 402 and 404, the slope and/or slew rate of the decline of the DC current limit corresponding to DC bus voltages between DC bus voltage threshold 404 and DC bus voltage threshold 406 may be steeper/greater. Alternatively, according to other embodiments of the present disclosure, the slope and/or slew rate of decrease between DC bus voltage thresholds 402 and 404 may be equal to or greater than the slope and/or rate of decrease between DC bus voltage thresholds 404 and 406. Further, for DC bus voltages below DC bus voltage threshold 406, the corresponding DC current limit may again be maintained at a constant value, which may represent the minimum DC current limit.

Figure 4B:
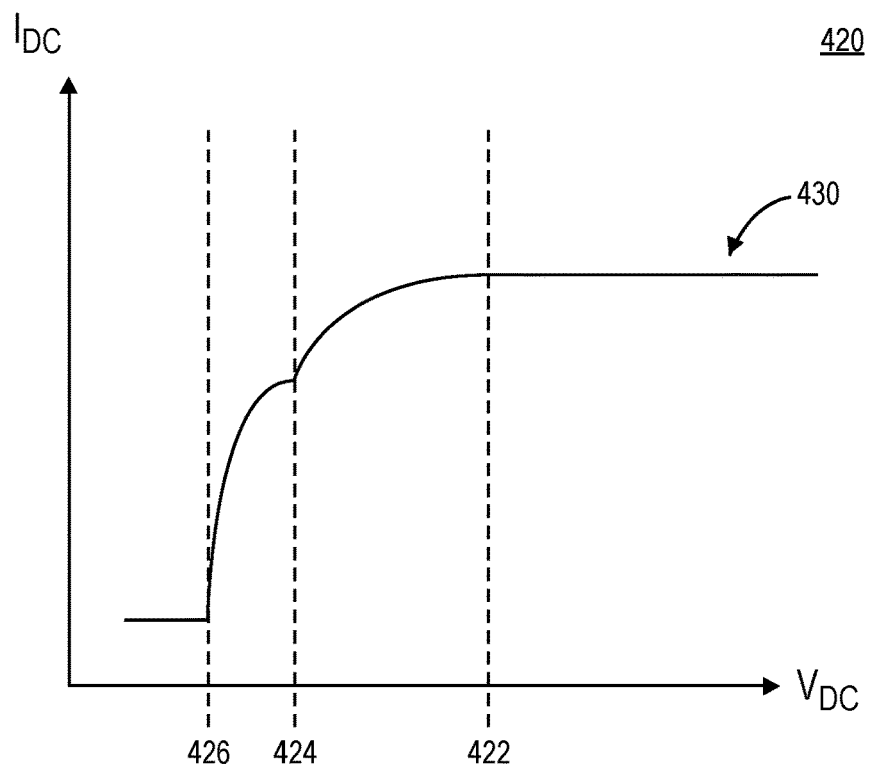

FIG. 4B illustrates another exemplary graphical representation 420 of another exemplary shape function 430. Similar to shape function 410 shown in FIG. 4A, as shown in the graphical representation 420 shown in FIG. 4B, shape function 430 may include DC bus voltage thresholds 422, 424, and 426. As illustrated in FIG. 4B, when the DC bus voltage is at or above DC bus voltage threshold 422, the corresponding DC current limit may be established at a relatively high constant value such that there is effectively no DC current limit. For DC bus voltages between DC bus voltage threshold 422 and DC bus voltage threshold 424, the corresponding DC current limit may decrease in accordance with the function illustrated in FIG. 4B. In the example implementation illustrated in FIG. 4B, the corresponding current limit decreases logarithmically for DC bus voltages between DC bus voltage threshold 422 and DC bus voltage threshold 424. For DC bus voltages between DC bus voltage threshold 424 and DC bus voltage threshold 426, the corresponding DC current limit may again decrease logarithmically. However, compared to the DC current limit corresponding to DC bus voltages between DC bus voltage thresholds 422 and 424, the rate of the decline of the DC current limit corresponding to DC bus voltages between DC bus voltage threshold 424 and DC bus voltage threshold 426 may be greater. Alternatively, according to other embodiments of the present disclosure, the rate of decrease between DC bus voltage thresholds 422 and 424 may be equal to or greater than the slope and/or rate of decrease between DC bus voltage thresholds 424 and 426. Further, for DC bus voltages below DC bus voltage threshold 426, the corresponding DC current limit may again be maintained at a constant value, which may represent the minimum DC current limit.

Figure 4C:
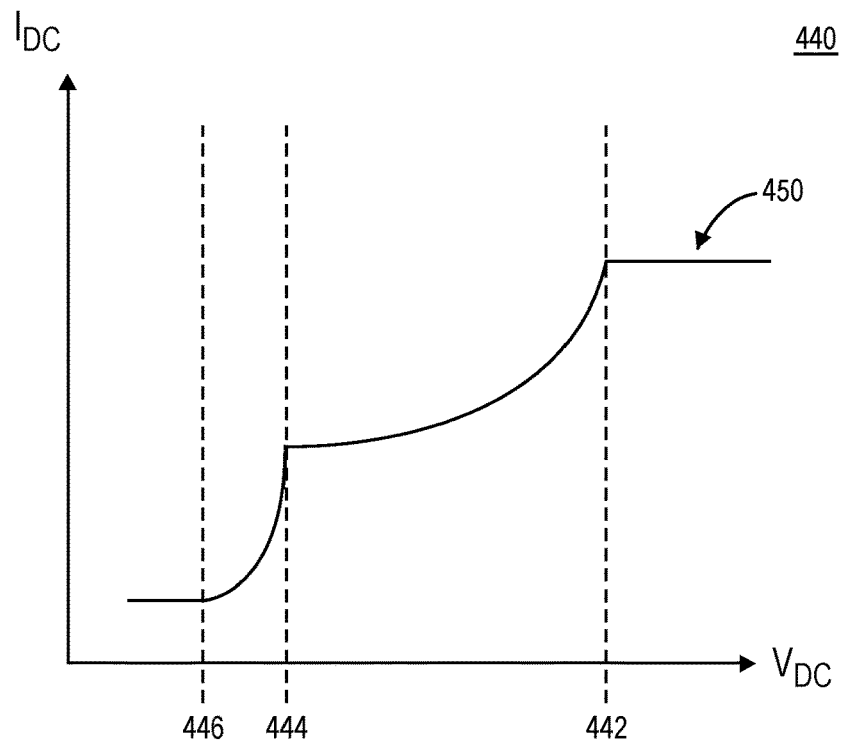

FIG. 4C illustrates another exemplary graphical representation 440 of another exemplary shape function 450. As shown in the graphical representation 440 shown in FIG. 4C, shape function 450 may include DC bus voltage thresholds 442, 444, and 446. Similar to shape functions 410 and 430 shown in FIGS. 4A and 4B, as illustrated in FIG. 4C, when the DC bus voltage is at or above DC bus voltage threshold 442, the corresponding DC current limit may be established at a relatively high value such that there is effectively no DC current limit. For DC bus voltages between DC bus voltage threshold 442 and DC bus voltage threshold 444, the corresponding DC current limit may decrease in accordance with the function illustrated in FIG. 4C. In the example implementation illustrated in FIG. 4C, the corresponding current limit decreases exponentially for DC bus voltages between DC bus voltage threshold 442 and DC bus voltage threshold 444. For DC bus voltages between DC bus voltage threshold 444 and DC bus voltage threshold 446, the corresponding DC current limit may again decrease exponentially. However, compared to the DC current limit corresponding to DC bus voltages between DC bus voltage threshold 442 and 444, the rate of the decline of the DC current limit corresponding to DC bus voltages between DC bus voltage threshold 444 and DC bus voltage threshold 446 may be greater. Alternatively, according to other embodiments of the present disclosure, the rate of decrease between DC bus voltage thresholds 442 and 444 may be equal to or greater than the slope and/or rate of decrease between DC bus voltage thresholds 444 and 446. Further, for DC bus voltages below DC bus voltage threshold 446, the corresponding DC current limit may again be maintained at a constant value, which may represent the minimum DC current limit.

Figure 4D:
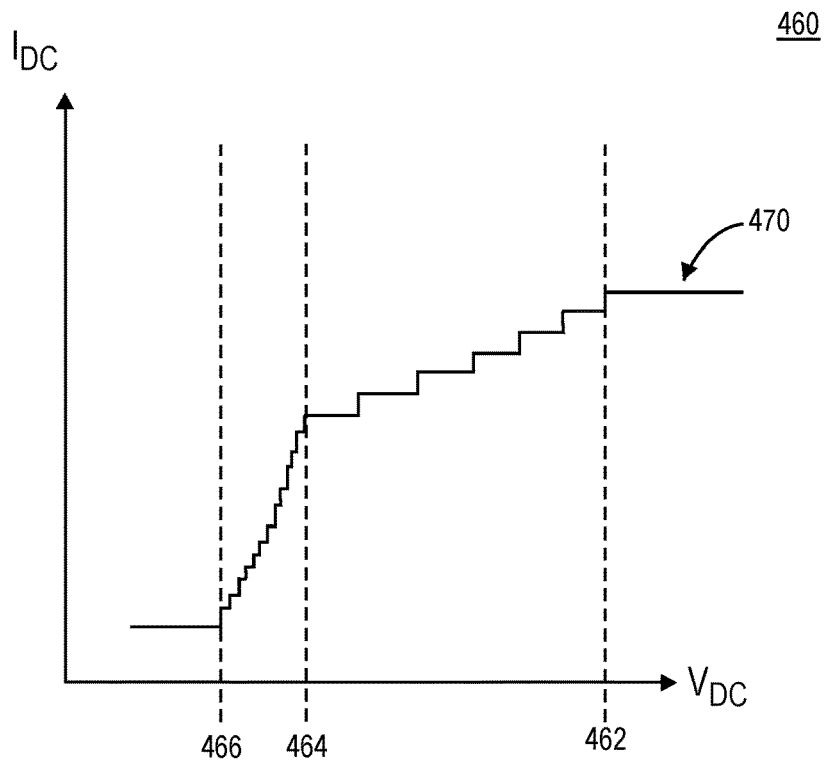

FIG. 4D illustrates another exemplary graphical representation 460 of another exemplary shape function 470. As shown in the graphical representation 460 shown in FIG. 4D, shape function 470 may include DC bus voltage thresholds 462, 464, and 466. Similar to shape functions 410, 430, and 450 shown in FIGS. 4A-4C, as illustrated in FIG. 4D, when the DC bus voltage is at or above DC bus voltage threshold 462, the corresponding DC current limit may be established at a relatively high value such that there is effectively no DC current limit. For DC bus voltages between DC bus voltage threshold 462 and DC bus voltage threshold 464, the corresponding DC current limit may decrease in accordance with the function illustrated in FIG. 4D. In the example implementation illustrated in FIG. 4D, the corresponding current limit decreases in accordance with a stepwise function for DC bus voltages between DC bus voltage threshold 462 and DC bus voltage threshold 464. For DC bus voltages between DC bus voltage threshold 464 and DC bus voltage threshold 466, the corresponding DC current limit may again decrease in accordance with a stepwise function. However, compared to the DC current limit corresponding to DC bus voltages between DC bus voltage threshold 462 and 464, the slope and/or slew rate of the decline of the DC current limit corresponding to DC bus voltages between DC bus voltage threshold 464 and DC bus voltage threshold 466 may be much steeper. Alternatively, according to other embodiments of the present disclosure, the rate of decrease between DC bus voltage thresholds 462 and 464 may be equal to or greater than the slope and/or rate of decrease between DC bus voltage thresholds 464 and 466. Further, for DC bus voltages below DC bus voltage threshold 466, the corresponding DC current limit may again be maintained at a constant value, which may represent the minimum DC current limit.

Figure 5:
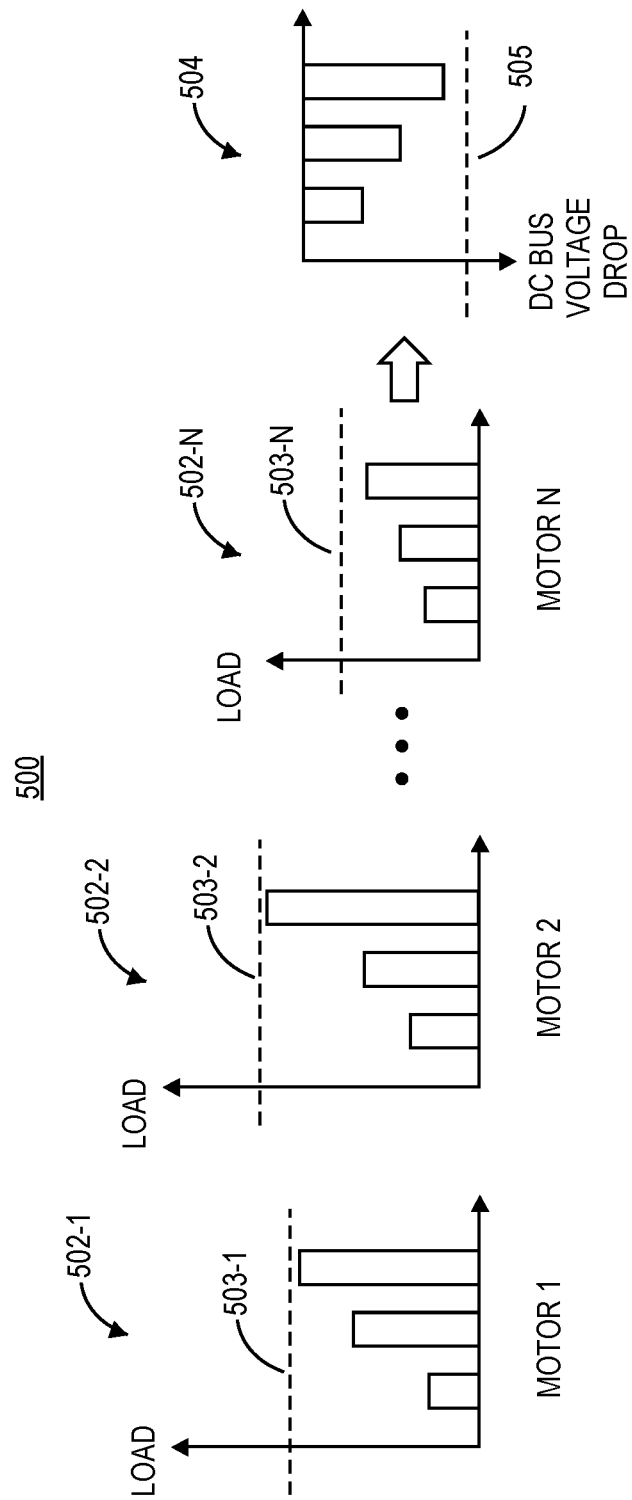
FIG. 5 is an exemplary graphical representation of exemplary loads presented by multiple motors electrically coupled to a shared DC bus and the DC bus voltage on the shared DC bus, according to exemplary embodiments of the present disclosure.

FIG. 5 is an exemplary graphical representation 500 of exemplary loads presented by multiple motors electrically coupled to a shared DC bus and the DC bus voltage on the shared DC bus, according to exemplary embodiments of the present disclosure.

FIG. 5 illustrates graphical representation 500, which includes graphical representations 502 of power consumed/loads presented by corresponding motors (e.g., motors 208) connected via a shared DC bus (e.g., shared DC bus 204) of a shared DC bus system (e.g., shared DC bus system 200) that are being managed by the power monitoring and managing mechanisms according to exemplary embodiments of the present disclosure, and a corresponding graphical representation 504 of a DC bus voltage on the shared DC bus in view of the power consumed/loads presented by the motors on the shared DC bus system and illustrated in graphical representations 502.

As shown FIG. 5, each of graphical representations 502-1, 502-2, and 502-N may correspond to the power consumed and/or loads presented by motors (e.g., motors 208-1, 208-2, and 208-N, respectively) of a shared DC bus system. In the illustrated implementation, as shown by graphical representations 502, each of Motor 1, Motor 2, and Motor N may consume different amounts of power (and present different loads) based on operating conditions of the respective motor and may vary as a function of time. Increases in the consumed power/loads presented by Motor 1, Motor 2, and/or Motor N may correspond to situations where Motor 1, Motor 2, and/or Motor N is drawing increased current in response to a command issued to increase thrust in connection with the operation of the UAV, while decreases in the consumed power/loads presented by Motor 1, Motor 2, and/or Motor N may correspond to situations where Motor 1, Motor 2, and/or Motor N is drawing decreased current in response to a command issued to decrease thrust in connection with the operation of the UAV.

As shown in graphical representation 504 of FIG. 5, the varied power consumption and/or loads (e.g., and current draw) of Motor 1, Motor 2, and/or Motor N may also be reflected in the DC bus voltage of the shared DC bus. For example, as power consumption increases, the cumulative loads presented by Motor 1, Motor 2, and/or Motor N increases, and the DC bus voltage on the shared DC bus may decrease. Conversely, as power consumption decreases, the cumulative loads presented by Motor 1, Motor 2, and/or Motor N increases, and the DC bus voltage on the shared DC bus may increase.

As shown in FIG. 5, load/power thresholds 503-1, 503-2, and/or 503-N may represent maximum allowable consumed power/loads for Motor 1, Motor 2, and/or Motor N and may be determined based on current limits imposed and enforced by the power monitoring and managing mechanisms according to exemplary embodiments of the present disclosure in connection with Motor 1, Motor 2, and/or Motor N, respectively. For example, each of load/power thresholds 503-1, 503-2, and/or 503-N may be based on the motor current limits established by shape functions associated with each of Motor 1, Motor 2, and/or Motor N, respectively. As described herein, the shape functions establishing current limits for each of Motor 1, Motor 2, and/or Motor N may be determined based on the particular application of Motor 1, Motor 2, and Motor N (as well as the shared DC bus system in which they are implemented) so as to prevent collapse of the DC bus voltage on the shared DC bus (e.g., brown-out condition) in view of the cumulative power consumed/load presented by Motor 1, Motor 2, and/or Motor N. For example, the shape function for Motor 1, Motor 2, and/or Motor N may be determined based on one or more DC bus voltage thresholds. For each DC bus voltage threshold of the shared DC bus system in which they are implemented, a corresponding DC current limit may be established and the shape of the shape function between each of the DC bus voltage thresholds may also be determined. Further, the shape function between at least some of the one or more DC bus voltage thresholds may be based on any function and/or relationship between the DC voltage bus voltage and the DC current (e.g., linear, polynomial, exponential, logarithmic, etc.).

Further, the shape function determined and associated with each of Motor 1, Motor 2, and Motor N may be different. According to an example implementation, the shape function for each Motor 1, Motor 2, and/or Motor N may be further determined based at least in part on certain operational parameters (or expected operational parameters) associated with each Motor 1, Motor 2, and/or Motor N. The operational parameters (and/or expected operational parameters) may include, for example, parameters such as an amount to thrust to be generated (by each respective motor), primary function of the generated thrust of each respective motor (e.g., to provide lift, to provide yaw/pitch/roll control, etc.), the type of flight being performed (e.g., cruise flight, landing, take-off, hover flight, emergency maneuver, etc.), and the like, and may be used to determine a priority for each Motor 1, Motor 2, and/or Motor N. The priority associated with each Motor 1, Motor 2, and/or Motor N may represent a criticality associated with the commanded operation of each Motor 1, Motor 2, and/or Motor N in view of a particular operating condition, i.e., the motor having the highest priority may be considered to be most critical to the operation and/or safety of the UAV under the particular operating condition, and the shape function for each Motor 1, Motor 2, and/or Motor N may be then be determined based at least in part on the determined priority. Accordingly, the shape function for the motor having the highest priority may have a shape function that establishes higher current limits (and therefore consumes more power and presents a higher load) so that it may operate closer to the commanded operation compared to motors having a lower priority. The difference in the current limits for Motor 1, Motor 2, and/or Motor N established by the shape functions associated with Motor 1, Motor 2, and/or Motor N is reflected in graphical representations 502-1, 502-2, and/or 502-N.

As illustrated in FIG. 5, load/power thresholds 503-1, 503-2, and 503-N are different for each of Motor 1, Motor 2, and Motor N. Accordingly, the difference in the thresholds may be attributed to differences in the current limits established by the shape functions associated with Motor 1, Motor 2, and Motor N. For example, load/power threshold 503-2 for Motor 2, which is higher than load/power thresholds 503-1 and 503-N for Motor 1 and Motor N, may correspond to a higher current limit that is defined by the shape function associated with Motor 2. This may correspond to Motor 2 having a higher priority in view of certain operational parameters than Motor 1 and/or Motor N, e.g., high power consumption by Motor 2 is of relative greater importance relative to Motor 1 and/or Motor N. Similarly, as load/power threshold 503-1 for Motor 1 is greater than load/power threshold 503-N associated with Motor N, this may correspond to Motor 1 having a higher priority in view of certain operational parameters than Motor N, e.g., high power consumption by Motor 1 is of relative greater importance relative to Motor N.

As shown in graphical representation 504, the DC bus voltage on the shared DC bus may vary (e.g., inversely) in view of the changing power consumption/load (and current draw) of Motor 1, Motor 2, and/or Motor N. Accordingly, as the cumulative power consumption of Motor 1, Motor 2, and/or Motor N increases, the DC bus voltage on the shared DC bus may decrease. However, in view of the current limits defined by the shape functions associated with Motor 1, Motor 2, and Motor N, the power consumed/load presented by each of Motor 1, Motor 2, and Motor N may each remain below each respective load/power threshold 503-1, 503-2, and 503-N such that the DC bus voltage does not reach threshold value 505, which can represent the point at which the DC bus voltage has collapsed.

Figure 6:
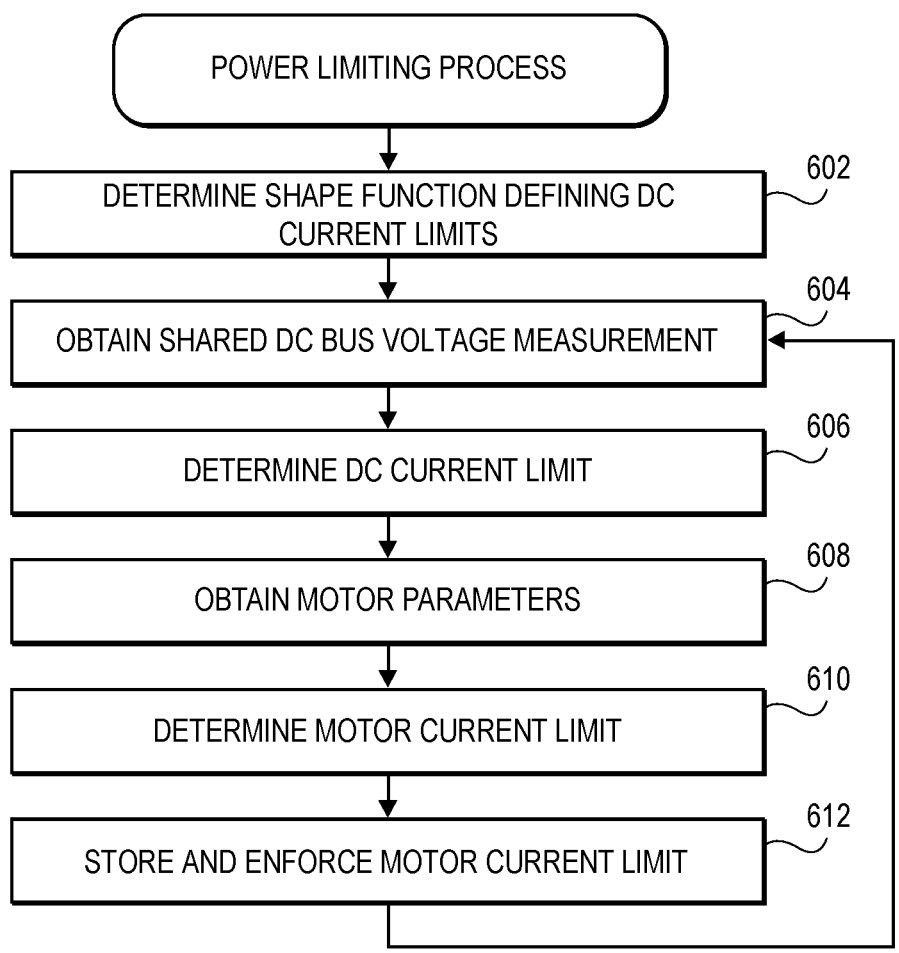
FIG. 6 is flow diagram of an exemplary power limiting process, according to exemplary embodiments of the present disclosure.

FIG. 6 is flow diagram of an exemplary power limiting process 600, according to exemplary embodiments of the present disclosure.

As shown in FIG. 6, power limiting process 600 may begin with determining a shape function defining and/or establishing DC current limits as a function of a DC bus voltage for one or more motors/propulsion mechanisms electrically coupled to a shared DC bus in a shared bus system, as in step 602. As described herein, the shape functions establishing current limits for the one or more motors may be determined based on the particular application of the motors, as well as the shared DC bus system in which they are implemented, and certain operating conditions of the motors, so as to prevent a collapse of the DC bus voltage on the shared DC bus (e.g., brown-out condition) in view of the cumulative power consumed/load presented by the motors. Determining exemplary shape functions are described in further detail herein in connection with FIGS. 2, 4A-4D, and 7. The determined shape functions may be written to respective motor controllers associated with each of the motors that are configured to control and monitor operation of the motors.

In step 604, the DC bus voltage of the shared DC bus may be measured and/or monitored. Based on the DC bus voltage obtained in step 604, a DC current limit may be determined for each motor, as in step 606. According to exemplary embodiments of the present disclosure, the DC current limit may be obtained from the shape function associated with each motor. For example, for a measured and/or monitored DC bus voltage, a corresponding current limit may be determined using the respective shape function for each motor.

In step 608, certain parameters associated with each motor may be obtained. The parameters may include, for example, an efficiency associated with each motor, a torque constant associated with each motor, a motor constant associated with each motor, the angular velocity (e.g., revolutions per minute) of each motor, and the like. With the motor parameters and the DC current limit, a motor current limit may be determined for each motor, as in step 610. For example, the motor current limit for a motor may be represented as:

$$I_{Motor\_Max} = \frac{\eta V_{DC} I_{DC}}{\omega K_T}$$

where $I_{Motor\_Max}$ can represent the motor current limit, $V_{DC}$ can represent the DC bus voltage, $I_{DC}$ can represent the DC current limit, n can represent the efficiency of the respective motor, $\omega$ can represent the angular velocity of the respective motor, and $K_T$ can represent the torque constant of the respective motor. The motor current limit may be stored, maintained, and enforced (e.g., by the motor controller) in the operation of each respective motor, as in step 612. This may be performed, for example, as a comparison of the current required for a commanded operation and the motor current limit. For example, if a motor controller receives a command to perform an operation that would require its respective motor to draw 100A, but the motor current limit for the respective motor has been determined to be 80A (e.g., based on the shared DC bus voltage, the shape function, and the angular velocity/revolutions per minute of the motor, which may be obtained via a feedback signal), the motor controller may limit the operation to a maximum allowable motor current drawn by the motor to 80A.

Figure 7:
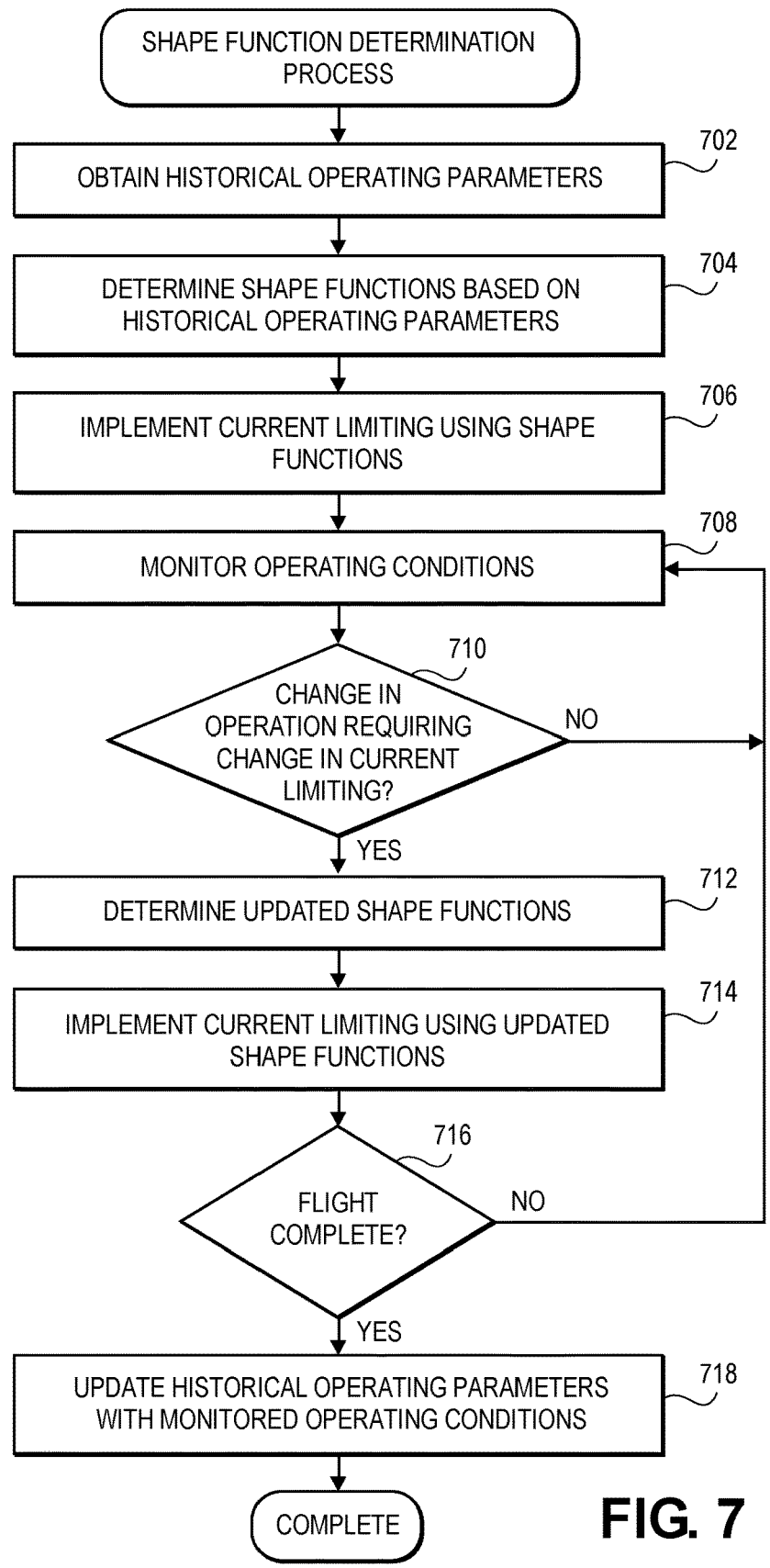
FIG. 7 is a flow diagram of an exemplary shape function determination process, according to exemplary embodiments of the present disclosure.

FIG. 7 is a flow diagram of an exemplary shape function determination process 700, according to exemplary embodiments of the present disclosure.

As shown in FIG. 7, shape function determination process 700 may begin by obtaining historical operating parameters, as in step 702. This may include, for example, parameters and information stored and maintained (e.g., in a lookup table, etc.) in connection with the historical operation of a shared bus system including motors/propulsion mechanisms electrically coupled to a shared DC bus of a UAV. The parameters and information may include information such as, DC bus voltages, power consumed/load presented/current drawn by each of the motors, thrust generated by each of the motors, function/purpose of the thrust generated by each of the motors (e.g., to generate lift, yaw/pitch/roll control, etc.), and the like.

Based on the historical operating parameters obtained in step 702, shape functions for each of the motors may be determined, as in step 704. Determination of the shape function may include determining one or more DC bus voltage thresholds, as well as the function/relationship between the DC current limit and the DC bus voltage between the various DC bus voltage thresholds. The shape function for the motors may be determined based on the particular application of the shared DC bus system and each motor employed by the shared DC bus system. The shape functions may establish DC current limits as a function of the DC bus voltage so as to prevent collapse of the DC bus voltage on the shared DC bus (e.g., brown-out condition) in view of the cumulative load presented by the motors. For example, a maximum cumulative allowable DC current may first be determined. The maximum cumulative allowable current may be based on, for example, the DC current at which the DC bus voltage may collapse, less a buffer value. The maximum cumulative allowable DC current may be divided and allocated across the motors based on the his-torical operating parameters. The DC current may be divided and allocated based on, for example, parameters such as an expected power consumed/load presented/current drawn by each of the motors, expected thrust generated by each of the motors, function/purpose of the thrust generated by each of the motors (e.g., to generate lift, yaw/pitch/roll control, etc.), the operating condition of the UAV (e.g., cruise flight, take-off, landing, hover flight, weather conditions, etc.), and the like. According to certain implementations, the parameters may be processed to determine a priority (e.g., a weighted average, using a trained machine learning model, using a rule-based technique, using a probabilistic technique, etc.) associated with each motor, which may represent a criticality of each motor in connection with the operation and/or safety of the UAV under the particular operating conditions.

In step 706, current limiting of the motors may be implemented in accordance with the shape functions determined for each motor. For example, the shape functions may be written to a motor controller, which may enforce the current limits defined in the shape function based on a measured DC bus voltage and an angular velocity (e.g., revolutions per minute) of each respective motor, which may be provided as a feedback signal to the motor controller.

Optionally, the operating conditions of the UAV may continued to be monitored during operation/flight of the UAV, as in step 708. Based on the monitored operating conditions of the UAV, it can be determined if a change to the current limiting is advisable based on a change in the operating conditions of the UAV in step 710. If a change in the current limiting is advisable, the shape functions may be continuously and dynamically updated in view of the monitored operating conditions, as in step 712. For example, current limits may preferably be updated in view of changing weather conditions, changing operating status of the UAV (e.g., one motor becomes inoperable or experiences a reduction in performance, change in aerodynamics of the UAV, etc.), and the like. In step 714, current limiting of the motors may be implemented (e.g., in a manner similar to that employed in connection with step 704) using the updated shape functions.

In step 716, it can be determined whether the flight/operation of the UAV is complete. If the flight/operation of the UAV is not yet complete, process 700 may return to step 708 to continue monitoring operation of the UAV so that the shape functions may be continuously and dynamically updated in view of the operating conditions to perform current limiting accordingly. If the flight/operation of the UAV has been completed, in step 718 the historical operating parameters may be updated with the monitored operating conditions, as necessary.

Figure 8:
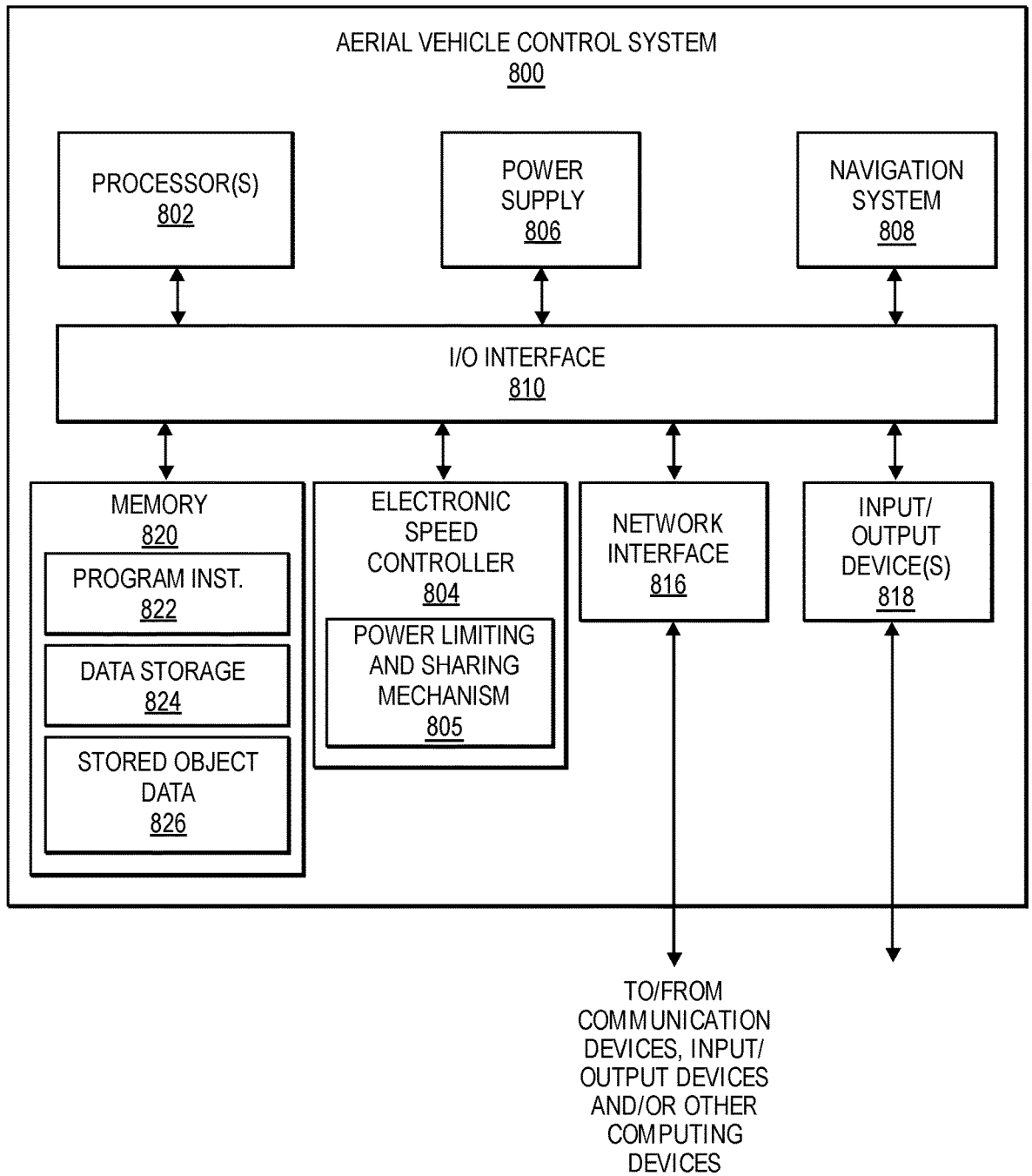
FIG. 8 is a block diagram illustrating various components of an exemplary aerial vehicle control system, according to exemplary embodiments of the present disclosure.

FIG. 8 is a block diagram illustrating various components of an exemplary aerial vehicle control system 800, according to exemplary embodiments of the present disclosure.

In various examples, the block diagram may be illustrative of one or more aspects of the aerial vehicle control system 800 that may be used to implement the various systems and processes discussed above. In the illustrated implementation, the aerial vehicle control system 800 includes one or more processors 802, coupled to a non-transitory computer readable storage medium 820 via an input/output (I/O) interface 810. The aerial vehicle control system 800 may also include one or more electronic speed controllers 804, a power supply or battery 806, and/or a navigation system 808. The aerial vehicle control system 800 may further include network interface 816 and one or more input/output devices 818.

In various implementations, the aerial vehicle control system 800 may be a uniprocessor system including one processor 802, or a multiprocessor system including several processors 802 (e.g., two, four, eight, or another suitable number). The processor(s) 802 may be any suitable processor capable of executing instructions. For example, in various implementations, the processor(s) 802 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 802 may commonly, but not necessarily, implement the same ISA.

The non-transitory computer readable storage medium 820 may be configured to store executable instructions, data, and historical flight information and/or motor information, including efficiency data, torque constant data, expected power consumed/load presented/current drawn by each of the motors, expected thrust generated by each of the motors, function/purpose of the thrust generated by each of the motors (e.g., to generate lift, yaw/pitch/roll control, etc.), the operating condition of the UAV (e.g., cruise flight, take-off, landing, hover flight, weather conditions, etc.), and/or other data items accessible by the processor(s) 802. In various implementations, the non-transitory computer readable storage medium 820 may be implemented using any suitable memory technology, such as static random-access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer readable storage medium 820 as program instructions 822, data storage 824, and stored object data 826, respectively. In other implementations, program instructions and/or stored data may be received, sent or stored upon different types of computer-accessible media, such as non-transitory media, or on similar media separate from the non-transitory computer readable storage medium 820 or the aerial vehicle control system 800.

Generally, a non-transitory, computer readable storage medium may include storage media or memory media such as magnetic or optical media, e.g., disk or CD/DVD-ROM, coupled to the aerial vehicle control system 800 via the I/O interface 810. Program instructions and data stored via a non-transitory computer readable medium may be transmitted by transmission media or signals, such as electrical, electromagnetic, or digital signals, which may be conveyed via a communication medium such as a network and/or a wireless link, such as may be implemented via the network interface 816.

In one implementation, the I/O interface 810 may be configured to coordinate I/O traffic between the processor(s) 802, the non-transitory computer readable storage medium 820, and any peripheral devices, the network interface or other peripheral interfaces, such as input/output devices 818. In some implementations, the I/O interface 810 may perform any necessary protocol, timing or other data transformations to convert data signals from one component (e.g., non-transitory computer readable storage medium 820) into a format suitable for use by another component (e.g., processor(s) 802). In some implementations, the I/O interface 810 may include support for devices attached through various types of peripheral buses, such as a variant of the Peripheral Component Interconnect (PCI) bus standard or the Universal Serial Bus (USB) standard, for example. In some implementations, the function of the I/O interface 810 may be split into two or more separate components, such as a north bridge and a south bridge, for example. Also, in some implementations, some or all of the functionality of the I/O interface 810, such as an interface to the non-transitory computer readable storage medium 820, may be incorporated directly into the processor(s) 802.

The electronic speed controller 804, which may include and employ power limiting and sharing mechanism 805, communicates with the navigation system 808 and adjusts the operational characteristics of each propulsion mechanism to guide the aerial vehicle along a determined path and/or to perform other navigational maneuvers. The navigation system 808 may include a GPS, IMU, altimeter, speed sensors, or other similar system than can be used to navigate the aerial vehicle to and/or from a location.

The aerial vehicle control system 800 may also include power limiting and sharing mechanism 805 that communicates with the processor(s) 802, the non-transitory computer readable storage medium 820, power supply 806, electronic speed controller 804, and/or other components or systems described herein to provide a motor drive and/or control, as well as provide a tiered protection mechanism for such systems, as described herein.

The network interface 816 may be configured to allow data to be exchanged between the aerial vehicle control system 800, other devices attached to a network, such as other computer systems, imaging sensors, and/or control systems of other vehicles, systems, machines, equipment, apparatuses, or devices. For example, the network interface 816 may enable wireless communication between numerous aerial vehicles. In various implementations, the network interface 816 may support communication via wireless general data networks, such as a Wi-Fi network. For example, the network interface 816 may support communication via telecommunications networks such as cellular communication networks, satellite networks, and the like.

Input/output devices 818 may, in some implementations, include one or more displays, imaging sensors, image capture devices, thermal sensors, infrared sensors, time of flight sensors, accelerometers, pressure sensors, weather sensors, various other sensors described herein, etc. Multiple input/output devices 818 may be present and controlled by the aerial vehicle control system 800. One or more of these sensors may be utilized to assist in performing the various functions, operations, and processes described herein.

As shown in FIG. 8, the memory may include program instructions 822, which may be configured to implement the example processes and/or sub-processes described above. The data storage 824 may include various data stores for maintaining data items that may be provided for performing the various functions, operations, and processes described herein. For example, the data storage 824 may include stored data object data 826, such as trajectory/flight path/planning, wind data, preferred orientation data, failure condition data, DC current information, DC bus voltage information, motor information, flight operation information, flight transition data, vulnerable orientation data, and/or other data items.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the processes represented in FIGS. 6 and 7, orders in which such methods or processes are presented are not intended to be construed as any limitation on the claimed invention, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. A method, comprising:
    measuring a voltage on a shared direct current (DC) bus;
    determining, based at least in part on the measured voltage on the shared DC bus and a shape function associated with a motor electrically coupled to the shared DC bus, a current limit for the motor, wherein the shape function specifies DC current limits as a function of the voltage on the shared DC bus and is determined based on at least one of a DC bus voltage threshold, a maximum cumulative DC current for the shared DC bus, a thrust to be generated by the motor, a function of the motor, a type of operation associated with the motor, or a priority associated with the motor; and
    limiting a current drawn by the motor during operation of the motor to the current limit.

2. The method of claim 1, wherein the current limit is further based at least in part on:
    an angular velocity associated with the motor;
    an efficiency associated with the motor;
    the measured voltage on the shared DC bus; and
    a torque constant associated with the motor.

3. The method of claim 1, wherein the shape function includes a plurality of DC bus voltage thresholds.

4. The method of claim 3, wherein the plurality of DC bus voltage thresholds includes a first DC bus threshold, a second DC bus threshold, and a third DC bus threshold, and the shape function includes:
    a first constant value for the DC current limit above the first DC bus threshold;
    a first decreasing relationship between the DC current limit and the measured DC bus voltage between the first DC bus threshold and the second DC bus threshold;
    a second decreasing relationship between the DC current limit and the measured DC bus voltage between the second DC bus threshold and the third DC bus threshold; and
    a second constant value for the DC current limit below the third DC bus threshold.

5. The method of claim 4, wherein the second decreasing relationship indicates a greater rate of decline of the DC current limit as a function of the measured DC bus voltage than the first decreasing relationship.

6. A power limiting system, comprising:
    a first controller associated with a first motor and including a first shape function defining a first DC current limit for the first motor as a function of a measured DC bus voltage on a shared DC bus and being configured to, at least, limit a first motor current consumed by the first motor during operation of the first motor to a first DC current limit value based at least in part on a first measured DC bus voltage and in accordance with the first shape function, wherein the first shape function includes a first DC bus threshold, a second DC bus threshold, and a third DC bus threshold, and the first shape function includes:
        a first constant value for the first DC current limit above the first DC bus threshold;
        a first decreasing relationship between the first DC current limit and the measured DC bus voltage between the first DC bus threshold and the second DC bus threshold;
        a second decreasing relationship between the first DC current limit and the measured DC bus voltage between the second DC bus threshold and the third DC bus threshold; and
        a second constant value for the first DC current limit below the third DC bus threshold; and
    a second controller associated with a second motor and including a second shape function defining a second DC current limit for the second motor as a function of the measured DC bus voltage on the shared DC bus and being configured to, at least, limit a second motor current consumed by the second motor during operation of the second motor to a second DC current limit value based at least in part on the first measured DC bus voltage and in accordance with the second shape function.

7. The power limiting system of claim 6, wherein limiting the consumption of the first motor current includes:
   determining the first DC current limit value to include a corresponding first DC current limit value corresponding to the first measured DC bus voltage as defined by the first shape function; and
   converting the first DC current limit value to a first motor current limit.

8. The power limiting system of claim 7, wherein converting the first DC current limit to the first motor current limit is based at least in part on:
   an angular velocity associated with the first motor;
   an efficiency associated with the first motor;
   the first measured DC bus voltage; and
   a torque constant associated with the first motor.

9. The power limiting system of claim 6, wherein the second decreasing relationship indicates a greater rate of decline of the first DC current limit as a function of the measured DC bus voltage than the first decreasing relationship.

10. The power limiting system of claim 6, wherein at least one of the first decreasing relationship or the second decreasing relationship includes at least one of:
    a linear relationship;
    an exponential relationship;
    a stepwise relationship; or
    a logarithmic relationship.

11. The power limiting system of claim 6, wherein:
    the first controller is further configured to, at least, limit the first motor current consumed by the first motor during operation of the first motor to a third DC current limit value based at least in part on a second measured DC bus voltage and in accordance with the first shape function; and
    the second controller is further configured to, at least, limit the second motor current consumed by the second motor during operation of the second motor to a fourth DC current limit value based at least in part on the second measured DC bus voltage and in accordance with the second shape function.

12. The power limiting system of claim 6, wherein limiting the first motor current to the first DC current limit value and limiting the second motor current to the second DC current limit value prevents a DC bus voltage on the shared DC bus from dropping below a DC bus voltage threshold.

13. The power limiting system of claim 6, wherein the first shape function and the second shape function are determined based at least in part on at least one of:
    an operating condition of the first motor and the second motor;
    a first priority associated with the first motor and a second priority associated with the second motor;
    a weather condition in which the first motor and the second motor are operating; or
    a first function associated with the first motor and a second function associated with the second motor.

14. A method for limiting power to a first motor and a second motor, the method comprising:
    obtaining a first shape function associated with the first motor that defines a first direct current (DC) current limit as a function of a measured DC bus voltage for the first motor, wherein the first shape function includes a first DC bus threshold and a second DC bus threshold and establishes the first DC current limit at a first constant value above the first DC bus threshold and at a second constant value below the second DC bus threshold;
    obtaining a second shape function associated with the second motor;
    monitoring a DC bus voltage on a shared DC bus, wherein the first motor and the second motor are electrically coupled to the shared DC bus;
    determining, based at least in part on the DC bus voltage and the first shape function, the first DC current limit for the first motor for the DC bus voltage;
    determining, based at least in part on the DC bus voltage and the second shape function, a second DC current limit for the second motor;
    obtaining at least one command instructing a first operating mode for the first motor and a second operating mode for the second motor;
    in response to obtaining the at least one command, performing at least one of:
        determining that the first operating mode requires a first DC current that exceeds the first DC current limit and causing the first motor to operate such that a first operating current consumed by the first motor does not exceed first DC current limit; or
        determining that the second operating mode requires a second DC current that exceeds the second DC current limit and causing the second motor to operate such that a second operating current consumed by the second motor does not exceed second DC current limit.

15. The method of claim 14, wherein obtaining the first shape function and obtaining the second shape function includes:
    obtaining a plurality of historical operating parameters associated with the first motor and the second motor, wherein the plurality of historical operating parameters includes at least one of a first priority associated with the first motor, a second priority associated with the second motor, a weather condition associated with operation of the first motor and the second motor; a first function associated the first motor, a second function associated with the second motor, or a type of operation associated with the first motor and the second motor;
    determining a total DC current limit associated with the first motor and the second motor, the total DC current limit associated with a DC bus threshold for the shared DC bus; and
    determining the first shape function and the second shape function based at least in part on the plurality of historical operating parameters and the total DC current limit.

16. The method of claim 14, further comprising:
    monitoring operation of the first motor and the second motor;
    determining, based at least in part on the monitoring of the operation of the first motor and the second motor, at least one of an updated first shape function or an updated second shape function; and
    at least one of:
        limiting a first consumed DC current consumed by the first motor in accordance with the updated first shape function; or
        limiting a second consumed DC current consumed by the second motor in accordance with the updated second shape function.

17. The method of claim 14, wherein:
the first shape function further includes a third DC bus threshold and the first shape function establishes:
- a first decreasing relationship between the first DC current limit and the measured DC bus voltage between the first DC bus threshold and the third DC bus threshold;
- a second decreasing relationship between the first DC current limit and the measured DC bus voltage between the second DC bus threshold and the third DC bus threshold; and
- the second decreasing relationship indicates a greater rate of decline of the first DC current limit as a function of the measured DC bus voltage than the first decreasing relationship.

18. The method of claim 14, further comprising:
determining a first motor current limit based at least in part on the first DC current limit and at least one of an angular velocity associated with the first motor, an efficiency associated with the first motor, the DC bus voltage, or a torque constant associated with the first motor,
wherein causing the first motor to operate such that the first operating current consumed by the first motor does not exceed the first DC current limit is based at least in part on the first motor current limit.

* * * * *